United States Patent
Hong et al.

(10) Patent No.: US 10,390,372 B2
(45) Date of Patent: Aug. 20, 2019

(54) CARRIER RESELECTION UNDER BACKOFF MECHANISM OF RANDOM ACCESS PROCEDURE

(71) Applicant: LG ELECTRONICS INC., Seoul (KR)

(72) Inventors: Jongwoo Hong, Seoul (KR); Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/717,208

(22) Filed: Sep. 27, 2017

(65) Prior Publication Data

US 2018/0092131 A1 Mar. 29, 2018

Related U.S. Application Data

(60) Provisional application No. 62/401,140, filed on Sep. 28, 2016.

(51) Int. Cl.
| | |
|---|---|
| *H04W 36/36* | (2009.01) |
| *H04W 74/08* | (2009.01) |
| *H04W 36/08* | (2009.01) |
| *H04W 28/04* | (2009.01) |
| *H04W 36/00* | (2009.01) |

(52) U.S. Cl.
CPC ....... *H04W 74/0841* (2013.01); *H04W 36/08* (2013.01); *H04W 36/36* (2013.01); *H04W 28/04* (2013.01); *H04W 36/0077* (2013.01)

(58) Field of Classification Search
CPC . H04W 74/0841; H04W 36/36; H04W 36/08; H04W 28/04
See application file for complete search history.

(56) References Cited

U.S. PATENT DOCUMENTS

| | | | | |
|---|---|---|---|---|
| 2012/0106422 A1* | 5/2012 | Hultell | ................ | H04W 52/325 370/311 |
| 2017/0265230 A1* | 9/2017 | Liu | .................... | H04W 74/0841 |
| 2018/0288679 A1* | 10/2018 | Hessler | ................ | H04W 48/12 |

* cited by examiner

*Primary Examiner* — Wei Zhao
(74) *Attorney, Agent, or Firm* — Dentons US LLP

(57) ABSTRACT

A method and apparatus for a user equipment (UE) performing a random access to a network are disclosed. For this end, the UE selects a first carrier for the random access among multiple carriers, and transmits a first random access preamble for a first random access procedure via the first carrier to the network. Then, the UE applies backoff time to the first carrier and reselects a second carrier for the first random access procedure among the multiple carriers, when the first random access procedure is determined as not successful; and transmits a second random access preamble via the second carrier to the network. Here, reselecting the second carrier is performed before the backoff time applied to the first carrier ends.

14 Claims, 7 Drawing Sheets

(a) Control-Plane Protocol Stack (b) User-Plane Protocol Stack

CARRIER RESELECTION UNDER BACKOFF MECHANISM OF RANDOM ACCESS PROCEDURE

CROSS REFERENCE

This application claims the benefit of U.S. Provisional Patent Application No. 62/401,140, filed on Sep. 28, 2016, which is hereby incorporated by reference as if fully set forth herein.

BACKGROUND OF THE INVENTION

Field of the Invention

The present invention relates to a wireless communication system supporting random access procedure. More specifically, the present invention related to a method and apparatus for performing random access to the network with carrier reelection under backoff mechanism.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be referred to as eNB, gNB etc. However, in the following explanation, the term 15E' and 'eNodeB' are used for convenience.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

In LTE system, a UE performs RA (Random Access) procedure for several reasons (e.g. initial access, getting UL/DL, synch). During the RA procedure, a UE may transmit a RA preamble, then the UE will receive a corresponding RAR (Random Access Response). When the network's load is congested, a backoff mechanism can be applied. Specific a backoff indicator can be included in RAR. If a UE receives a RAR with backoff indicator, then the UE would delay a subsequent preamble transmission.

In previous approach, the conventional backoff mechanism will be performed per a UE. Therefore, when the RA procedure is performed on a carrier, a UE is not allowed to perform the RA procedure on other carriers when the UE receives an RAR included a backoff indicator.

In NB-IoT, an NB-IoT UE also performs a RA procedure with above stated reasons. In Rel-13, RA procedure was supported only on one anchor carrier. However, in Rel-14, for the sake of access/congestion control among the multiple carriers, 3GPP decided to support RA on multiple carriers, i.e., anchor carrier as well as non-anchor carriers.

Thus, there needs efficient RA procedure to take advantage of the use of multiple carriers.

SUMMARY OF THE INVENTION

To achieve these objects and other advantages and in accordance with the purpose of the invention, as embodied and broadly described herein, a method for a user equipment (UE) performing a random access to a network, the method comprising: selecting a first carrier for the random access among multiple carriers; transmitting a first random access preamble for a first random access procedure via the first carrier to the network; applying backoff time to the first carrier and reselecting a second carrier for the first random access procedure among the multiple carriers, when the first random access procedure is determined as not successful; and transmitting a second random access preamble via the second carrier to the network, wherein reselecting the second carrier is performed before the backoff time applied to the first carrier ends, is proposed.

The second carrier can be reselected among one or more carriers on which backoff time is not applied among the multiple carriers.

The backoff time can be applied per-carrier among the multiple carriers.

Reselecting the second carrier can be performed within a predetermined time after the first random access procedure is determined as not successful.

The carriers on which backoff time is not applied may include: a carrier on which backoff time had been applied, but the backoff time is expired at a given timing; and a carrier on which backoff time never been applied.

If there is no carrier on which backoff time is not applied at a given timing among the multiple carriers, reselecting the second carrier can be delayed until when there is a carrier on which the backoff time is expired.

The first random access procedure can be determined as not successful, if a random access response to the first random access preamble is not received within a predetermined time, or if a contention resolution of the first random access procedure is determined as not successful.

In another aspect of the present invention, a user equipment (UE) for performing a random access to a network, the UE comprising: a processor configured to select a first carrier for the random access among multiple carriers; and a transceiver configured to transmit a first random access preamble for a first random access procedure via the first carrier to the network, wherein the processor is further configured to apply backoff time to the first carrier and reselect a second carrier for the first random access procedure among the multiple carriers, when the first random access procedure is determined as not successful, and controls the transceiver to transmit a second random access preamble via the second carrier to the network, wherein the processor reselects the second carrier before the backoff time applied to the first carrier ends, is proposed.

The processor may reselect the second carrier among one or more carriers on which backoff time is not applied among the multiple carriers.

The processor may apply the backoff time per-carrier among the multiple carriers.

The processor may reselect the second carrier within a predetermined time after the first random access procedure is determined as not successful.

The carriers on which backoff time is not applied may include: a carrier on which backoff time had been applied, but the backoff time is expired at a given timing; and a carrier on which backoff time never been applied.

If there is no carrier on which backoff time is not applied at a given timing among the multiple carriers, the processor may delay the reselection of the second carrier until when there is a carrier on which the backoff time is expired.

The first random access procedure can be determined as not successful, if a random access response to the first random access preamble is not received within a predetermined time, or if a contention resolution of the first random access procedure is determined as not successful.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description relates to a wireless communication system supporting random access procedure (RAP). So, the details of the RAP are explained first.

Figure 1:
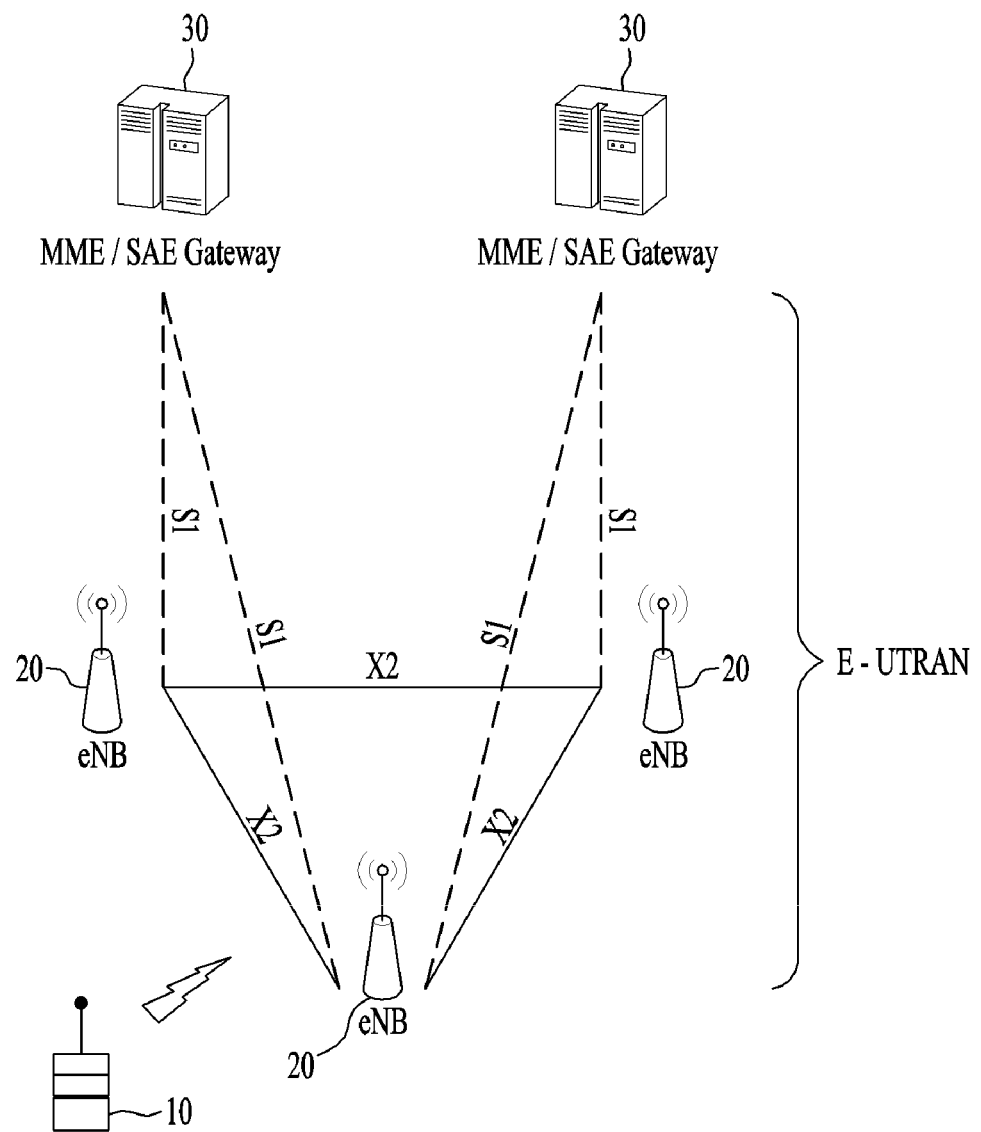
FIG. 1 is a block diagram illustrating network structure of an evolved universal mobile telecommunication system (E-UMTS)
Figure 2:
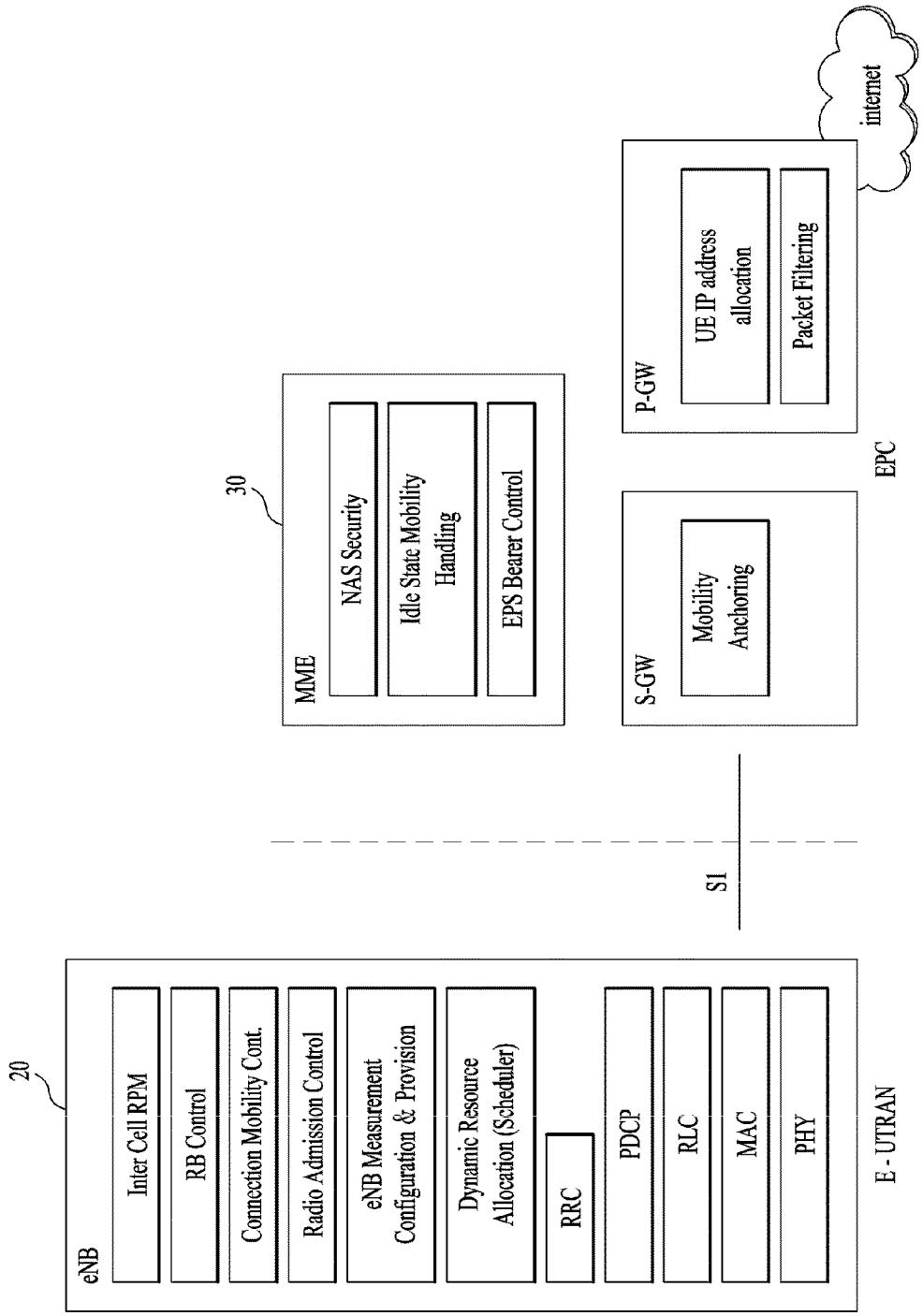
FIG. 2 is a block diagram depicting architecture of a typical E-UTRAN and a typical EPC.
Figure 3:
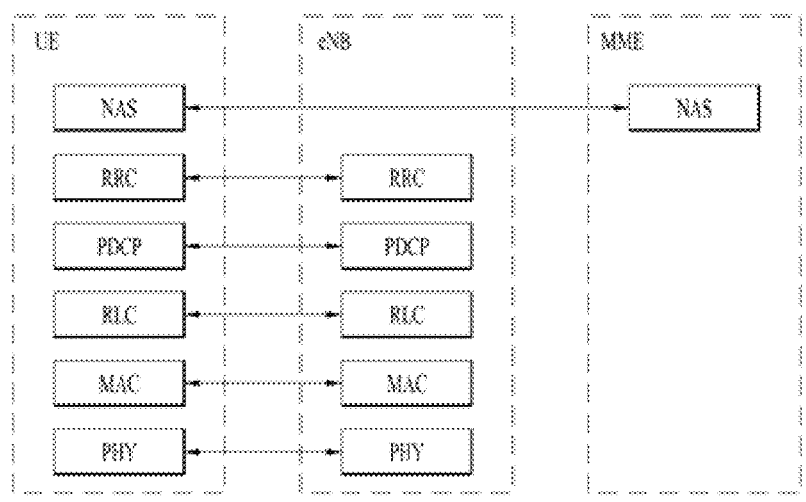
FIG. 3 is a diagram showing a control plane and a user plane of a radio interface protocol between a UE and an E-UTRAN based on a 3GPP radio access network standard.
Figure 3:
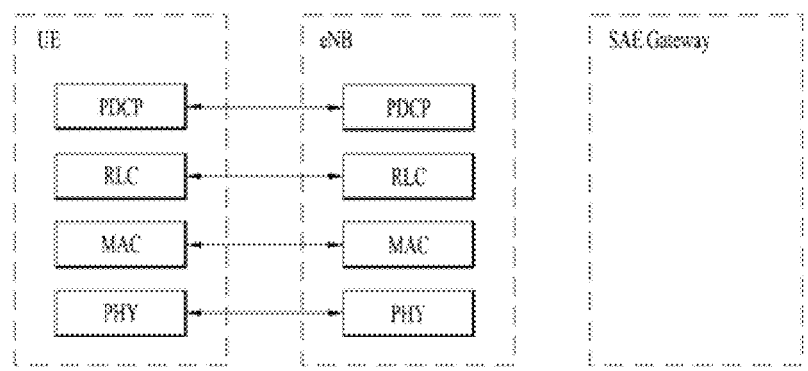
Figure 4:
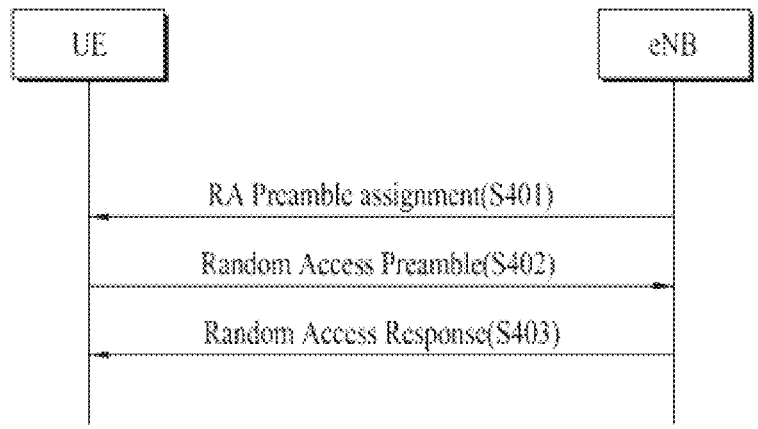
FIG. 4 is a diagram illustrating an operation procedure of a user equipment and a base station during a non-contention based random access procedure.

FIG. 4 is a diagram illustrating an operation procedure of a user equipment and a base station during a non-contention based random access procedure.

(1) Random Access Preamble Assignment

The non-contention based random access procedure can be performed for two cases, i.e., (1) when a handover procedure is performed, and (2) when requested by a command of the base station. Of course, the contention based random access procedure may also be performed for the two cases.

First of all, for non-contention based random access procedure, it is important that the user equipment receives a designated random access preamble having no possibility of contention from the base station. Examples of a method of receiving a random access preamble include a method through a handover command and a method through a PDCCH command. A random access preamble is assigned to the user equipment through the method of receiving a random access preamble (S401).

(2) First Message Transmission

As described above, after receiving a random access preamble designated only for the user equipment, the user equipment transmits the preamble to the base station (S402).

(3) Second Message Reception

After the user equipment transmits the random access preamble in step S402, the base station tries to receive its random access response within a random access response receiving window indicated through system information or handover command (S403). In more detail, the random access response can be transmitted in the form of a MAC protocol data unit (MAC PDU), and the MAC PDU can be transferred through a physical downlink shared channel (PDSCH). Also, it is preferable that the user equipment monitors a physical downlink control channel (PDCCH) to appropriately receive information transferred to the PDSCH. Namely, it is preferable that the PDCCH includes information of a user equipment which should receive the PDSCH, frequency and time information of radio resources of the PDSCH, and a transport format of the PDSCH. If the user equipment successfully receives the PDCCH transmitted thereto, the user equipment can appropriately receive a random access response transmitted to the PDSCH in accordance with the information of the PDCCH. The random access response can include a random access preamble identifier (ID) (for example, random access preamble identifier (RA-RNTI)), uplink grant indicating uplink radio resources, a temporary C-RNTI, and timing advance command (TAC) values.

As described above, the random access preamble identifier is required for the random access response to indicate whether the uplink grant, the temporary C-RNTI and the TAC values are effective for what user equipment as random access response information for one or more user equipments can be included in one random access response. In this case, it is assumed that the user equipment selects a random access preamble identifier corresponding to the random access preamble selected in step S402.

In the non-contention based random access procedure, the user equipment can terminate the random access procedure after determining that the random access procedure has been normally performed by receiving the random access response information.

Figure 5:
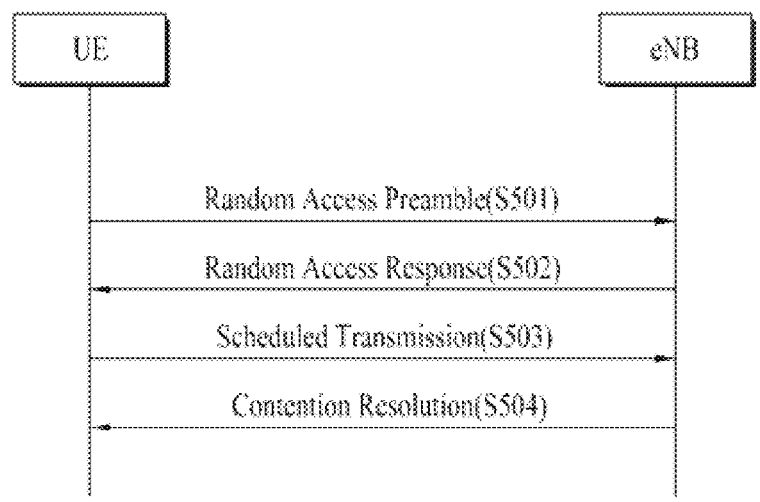
FIG. 5 is a diagram illustrating an operation procedure of a user equipment and a base station during a contention based random access procedure.

FIG. 5 is a diagram illustrating an operation procedure of a user equipment and a base station during a contention based random access procedure.

(1) First Message Transmission

First of all, the user equipment randomly selects one random access preamble from a set of random access preambles indicated through system information or handover command, and selects a physical RACH (PRACH) resource that can transmit the random access preamble (S501).

(2) Second Message Reception

A method of receiving random access response information is similar to that of the aforementioned non-contention based random access procedure. Namely, after the user equipment transmits the random access preamble in step S402, the base station tries to receive its random access response within a random access response receiving window indicated through system information or handover command, and receives the PDSCH through corresponding random access identifier information (S502). In this case, the base station can receive uplink grant, a temporary C-RNTI, and timing advance command (TAC) values.

(3) Third Message Transmission

If the user equipment receives its effective random access response, the user equipment respective processes information included in the random access response. Namely, the user equipment applies TAC and store a temporary C-RNTI. Also, the user equipment transmits data (i.e., third message) to the base station using UL grant (S503). The third message should include a user equipment identifier. This is because that the base station needs to identify user equipments which perform the contention based random access procedure, thereby avoiding contention later.

Two methods have been discussed to include the user equipment identifier in the third message. In the first method, if the user equipment has an effective cell identifier previously assigned from a corresponding cell before the random access procedure, the user equipment transmits its cell identifier through an uplink transport signal corresponding to the UL grant. On the other hand, if the user equipment does not have an effective cell identifier previously assigned from a corresponding cell before the random access procedure, the user equipment transmits its cell identifier including its unique identifier (for example, S-TMSI or random ID). Generally, the unique identifier is longer than the cell identifier. If the user equipment transmits data corresponding to the UL grant, the user equipment starts a contention resolution timer.

(4) Fourth Message Reception

After transmitting data including its identifier through UL grant included in the random access response, the user equipment waits for a command of the base station for contention resolution. Namely, the user equipment tries to receive the PDCCH to receive a specific message (504). Two methods have been discussed to receive the PDCCH. As described above, if the third message is transmitted to correspond to the UL grant using the user equipment identifier, the user equipment tries to receive the PDCCH using its cell identifier. If the user equipment identifier is a unique identifier of the user equipment, the user equipment tries to receive the PDCCH using a temporary cell identifier included in the random access response. Afterwards, in case of the first method, if the user equipment receives the PDCCH through its cell identifier before the contention resolution timer expires, the user equipment determines that the random access procedure has been performed normally, and ends the random access procedure. In case of the second method, if the user equipment receives the PDCCH through the temporary cell identifier before the contention resolution timer expires, the user equipment identifies data transferred from the PDSCH. If the unique identifier of the user equipment is included in the data, the user equipment determines that the random access procedure has been performed normally, and ends the random access procedure.

As explained above, according to LTE scheme, there is only one RA procedure at a given time. So, when the RA procedure is performed on a carrier, a UE is not allowed to perform the RA procedure on other carriers when the UE receives an RAR included a backoff indicator.

But, from Rel-14, for the sake of access/congestion control among the multiple carriers, 3GPP decided to support RA on multiple carriers, e.g. anchor carrier as well as non-anchor carriers.

Thus, one embodiment of the present invention proposes a backoff mechanism is performed based on a carrier. (i.e. per carrier backoff). In order for that, when a UE fails RA procedure on a first carrier, the UE reselects a second carrier among the carriers on which backoff time is not applied. Then, the UE will transmit a RA preamble (RAP) on the reselected second carrier.

In specific, a UE is configured with multiple carriers on which the UE can perform a RA procedure. When the RA procedure is triggered, the UE selects one of the carrier among the multiple carriers on which the UE can perform the RA procedure. After the carrier selection, the UE transmits a RA preamble and receives an RAR on the selected carrier.

If the UE fails the RA procedure on the selected carrier, then the UE triggers to perform a carrier reselection. In order to reselect one carrier, the UE checks other available carriers whether a backoff time is applied on that carrier or not. Among the carriers on which backoff time is not applied, the UE reselects one of the carriers. After that, the UE transmits a RA preamble on the reselected carrier.

Figure 6:
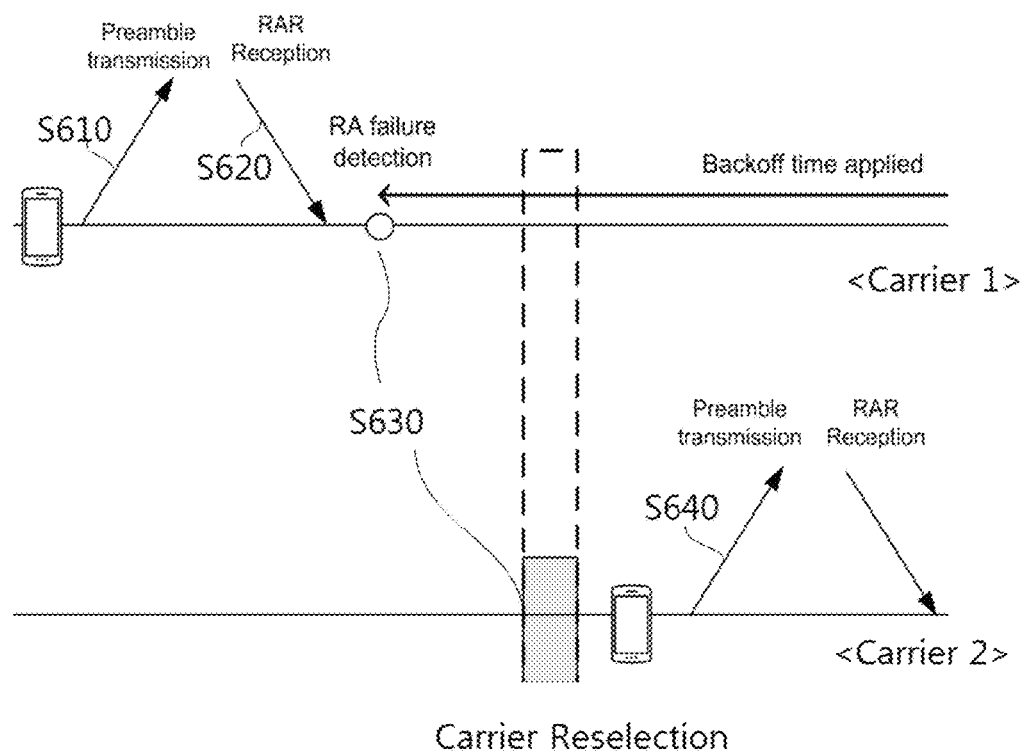
FIG. 6 shows an example according to one embodiment of the present invention.

FIG. 6 shows an example according to one embodiment of the present invention.

According to this example, the UE selects a first carrier for the random access among multiple carriers, and transmits a first random access preamble for a first random access procedure via the first carrier to the network (S610). Even though RAR is receipted (S620), the first random access procedure can be determined as not successful. In this case, the UE according to this embodiment of the present invention applies backoff time to the first carrier and reselects a second carrier for the first random access procedure among the multiple carriers (S630).

Based on this reselection of the second carrier, the UE can transmit a second random access preamble via the second carrier to the network (S640). As shown in FIG. 6, reselecting the second carrier is performed before the backoff time applied to the first carrier ends.

Figure 7:
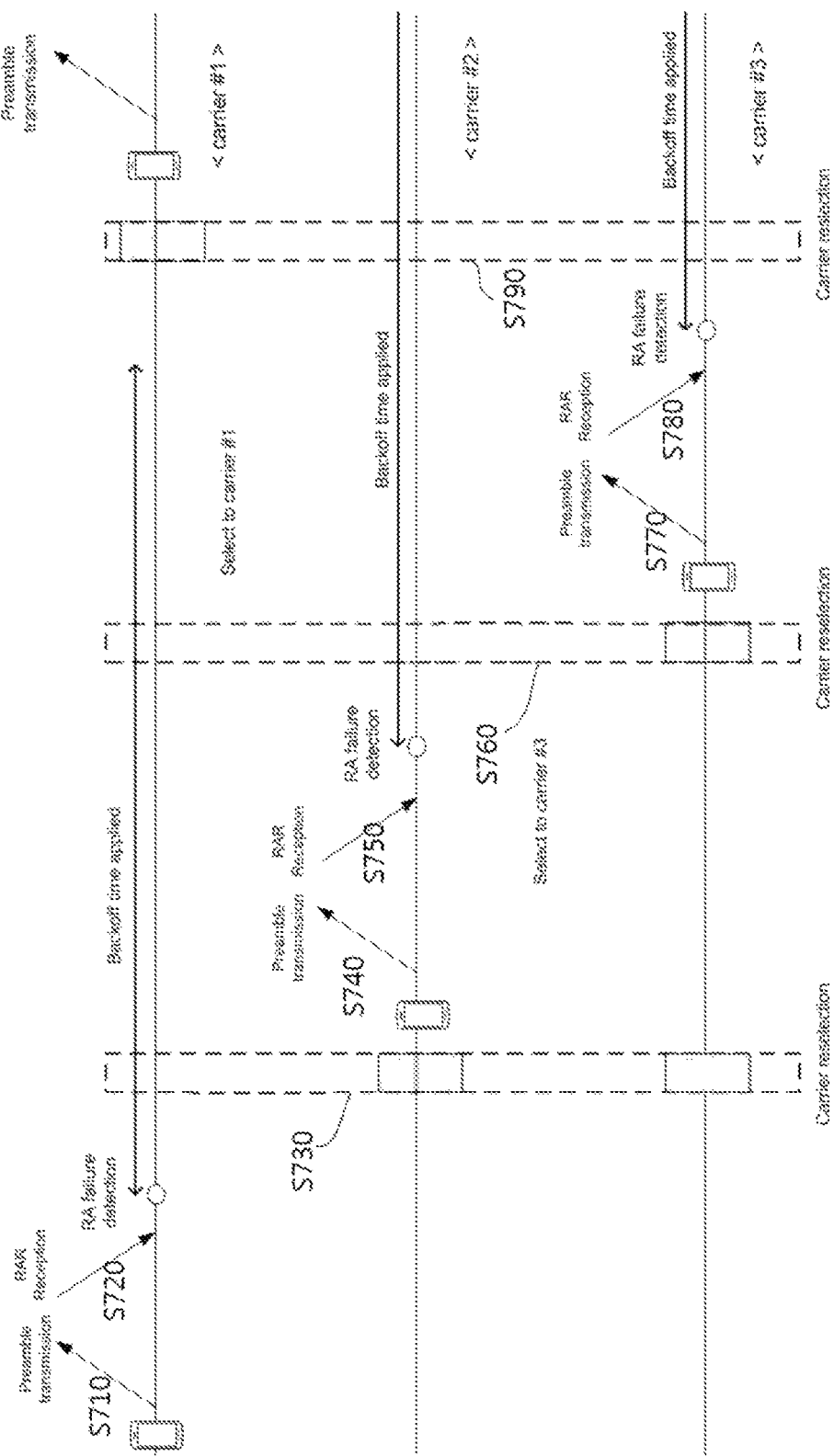
FIG. 7 shows another example according to one embodiment of the present invention.

FIG. 7 shows another example according to one embodiment of the present invention.

In this example, the UE is configured with multiple carriers (e.g. carriers 1-3) with PRACH resources. First, the UE trigger a RA procedure. For this end, the UE selects one carrier (e.g. carrier 1) on which the UE transmits a RAP and transmits random access preamble (S710).

The UE monitors to receive RAR in response to the transmitted RAP (S720). If the RA fails, the UE applies the backoff time on that carrier where the UE transmitted the RAP, and the UE determines the backoff parameter value (BPV) based on Backoff Indicator (BI) included in the RAR, and the UE select the backoff time randomly between 0 to BPV (S730).

When saying 'the UE applies the backoff time on a carrier', it means that the UE doesn't transmit a RAP on that carrier until the backoff time is expired for that carrier. After the backoff time is expired for that carrier, the UE can transmit a RAP on that carrier.

If the UE doesn't receive any RAR, the UE doesn't apply the backoff time on that carrier where the UE transmitted the RAP. But, the UE checks for each carrier (i.e., carrier 2, carrier 3) whether the backoff time is applied or not on that carrier. Based on it, the UE may reselect one carrier among the carriers where the backoff time is not applied (S730). When saying 'the backoff time is not applied on a carrier', it means that a backoff time was applied but expired for that carrier, or a backoff time has never been applied on that carrier.

If there is no carrier where backoff time is not applied, the UE may delay reselection of carrier until when the backoff time is expired for one of the carrier. In one example, the UE may (re-)selects the earliest available carrier in terms of backoff time expiration.

The UE may transmit a RAP on the reselected carrier (e.g. carrier 2) (S740). The UE monitors to receive RAR in response to the transmitted RAP, however, the UE considers that a RA failure occurs on the carrier 2 because the RAR does not include the transmitted RAP (S750).

The UE considers that RA fails in the following cases:
RAR is not received within RAR window;
RAR is received but contains different RAP ID;
Contention resolution is failed.

If the RA fails, the UE applies the backoff time on the carrier 2 where the UE transmitted RAP. After that, the UE performs a carrier reselection (S760).

The UE may check for each carrier (i.e., carrier 1, carrier 3) whether the backoff time is applied or not on that carriers. In FIG. 7, the UE reselects the carrier 3 where the backoff time is not applied.

So, the UE may transmit a RAP on the carrier 3 (S770). The UE may monitor to receive RAR in response to the transmitted RAP, however, the UE considers that a RA failure occurs on the carrier 3 because the RAR does not include the transmitted RAP (S780).

If the RA fails, the UE applies the backoff time on the carrier 3 where the UE transmitted RAP. After that, the UE performs a carrier reselection (S790). The UE may check for each carrier (i.e., carrier 1, carrier 2) whether the backoff time is applied or not on that carriers. Here, the backoff time applied to carrier 1 ends, thus carrier 1 is also available.

So, the UE can reselect the carrier 1 where the backoff time is not applied. And, the UE can transmit a RAP on the carrier 1.

Figure 8:
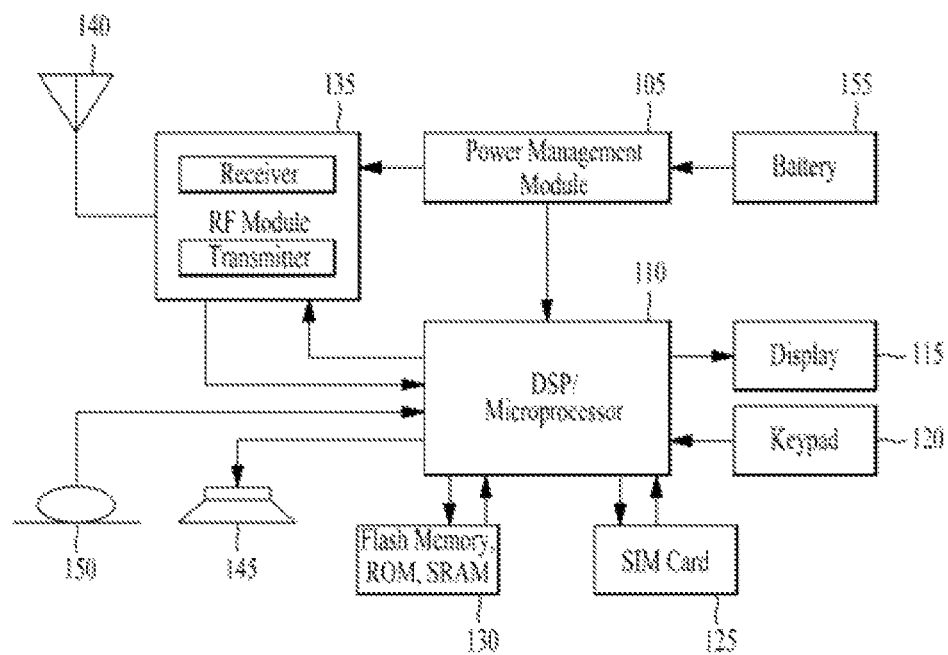
FIG. 8 is a block diagram of a communication apparatus according to an embodiment of the present invention.

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described method has been described centering on an example applied to the 3GPP system, the present invention is applicable to a variety of wireless communication systems, e.g. IEEE system, in addition to the 3GPP system.

What is claimed is:

1. A method for a user equipment (UE) performing a random access to a network, the method comprising:
    selecting a first carrier for the random access among multiple carriers;
    transmitting a first random access preamble for a first random access procedure via the first carrier to the network;
    applying backoff time to the first carrier and reselecting a second carrier for the first random access procedure among the multiple carriers, when the first random access procedure is determined as not successful; and
    transmitting a second random access preamble via the second carrier to the network,
    wherein reselecting the second carrier is performed before the backoff time applied to the first carrier ends.

2. The method of claim 1, wherein the second carrier is reselected among one or more carriers on which the backoff time is not applied among the multiple carriers.

3. The method of claim 1, wherein the backoff time is applied per-carrier among the multiple carriers.

4. The method of claim 1, wherein reselecting the second carrier is performed within a predetermined time after the first random access procedure is determined as not successful.

5. The method of claim 2, wherein the carriers on which the backoff time is not applied includes:
    a carrier on which the backoff time had been applied, but the backoff time is expired at a given timing; and
    a carrier on which the backoff time never been applied.

6. The method of claim 1, wherein, if there is no carrier on which the backoff time is not applied at a given timing among the multiple carriers, reselecting the second carrier is delayed until when there is a carrier on which the backoff time is expired.

7. The method of claim 1, wherein the first random access procedure is determined as not successful,
    when a random access response to the first random access preamble is not received within a predetermined time, or
    when a contention resolution of the first random access procedure is determined as not successful.

8. A user equipment (UE) for performing a random access to a network, the UE comprising:
    a processor configured to select a first carrier for the random access among multiple carriers; and
    a transceiver configured to transmit a first random access preamble for a first random access procedure via the first carrier to the network,
    wherein the processor is further configured to apply backoff time to the first carrier and reselect a second carrier for the first random access procedure among the multiple carriers, when the first random access procedure is determined as not successful, and controls the transceiver to transmit a second random access preamble via the second carrier to the network,
    wherein the processor reselects the second carrier before the backoff time applied to the first carrier ends.

9. The UE of claim 8, wherein the processor reselects the second carrier among one or more carriers on which the backoff time is not applied among the multiple carriers.

10. The UE of claim 8, wherein the processor applies the backoff time per-carrier among the multiple carriers.

11. The UE of claim 8, wherein the processor reselects the second carrier within a predetermined time after the first random access procedure is determined as not successful.

12. The UE of claim 9, wherein the carriers on which the backoff time is not applied includes:
    a carrier on which the backoff time had been applied, but the backoff time is expired at a given timing; and
    a carrier on which the backoff time never been applied.

13. The UE of claim 8, wherein, if there is no carrier on which the backoff time is not applied at a given timing among the multiple carriers, the processor delays the reselection of the second carrier until when there is a carrier on which the backoff time is expired.

14. The UE of claim 8, wherein the first random access procedure is determined as not successful,
    when a random access response to the first random access preamble is not received within a predetermined time, or
    when a contention resolution of the first random access procedure is determined as not successful.

* * * * *